US006585479B2

United States Patent
Torrance

(10) Patent No.: US 6,585,479 B2
(45) Date of Patent: Jul. 1, 2003

(54) CASING TREATMENT FOR COMPRESSORS

(75) Inventor: Mark Torrance, Waterboro, ME (US)

(73) Assignee: United Technologies Corporation, Hartford, CT (US)

( * ) Notice: Subject to any disclaimer, the term of this patent is extended or adjusted under 35 U.S.C. 154(b) by 29 days.

(21) Appl. No.: 09/929,572

(22) Filed: Aug. 14, 2001

(65) Prior Publication Data
US 2003/0035715 A1 Feb. 20, 2003

(51) Int. Cl.$^7$ ................................................ F01D 1/12
(52) U.S. Cl. ...................... 415/58.5; 415/115; 415/144; 415/914
(58) Field of Search ............................. 415/58.5, 54.1, 415/58.4, 58.7, 173.4, 173.1, 914, 144, 115

(56) References Cited

U.S. PATENT DOCUMENTS

| 5,282,718 A | 2/1994 | Koff et al. ................. 415/57.3 |
| 5,308,225 A | 5/1994 | Koff et al. ................. 415/57.3 |
| 5,474,417 A | 12/1995 | Privett et al. ............. 415/58.5 |
| 5,607,284 A | * 3/1997 | Byrne et al. .............. 415/58.5 |
| 5,607,285 A | 3/1997 | Eckel ........................ 416/170 R |
| 6,264,425 B1 | 7/2001 | Keller ........................ 415/58.7 |

FOREIGN PATENT DOCUMENTS

| EP | 0719908 A1 | 3/1996 |
| EP | 0751280 A1 | 2/1997 |

* cited by examiner

Primary Examiner—Edward K. Look
Assistant Examiner—James M McAleenan
(74) Attorney, Agent, or Firm—Linda A. P. Gunha

(57) ABSTRACT

A cast assembly for a gas turbine engine compressor, the compressor including a plurality of axial flow stators and a rotor having a plurality of axial flow blades, each of the blades having a tip section and a leading edge. The assembly comprises a stator outer platform, a boss, a passage, a blade outer shroud and a circumferential slot. A boss is formed in the platform and includes a passage. The passage includes an inlet and an outlet. The inlet is disposed in the circumferential slot. The outlet being disposed upstream of the leading edge of the blades. The passage circumferentially converges inward from the inlet to the outlet. The outer shroud joins with said outer platform during the assembly of the compressor such that the circumferential slot is formed downstream and proximate to the leading edge of the blades. The circumferential slot is in flow communication with the inlet and converges axially.

12 Claims, 4 Drawing Sheets

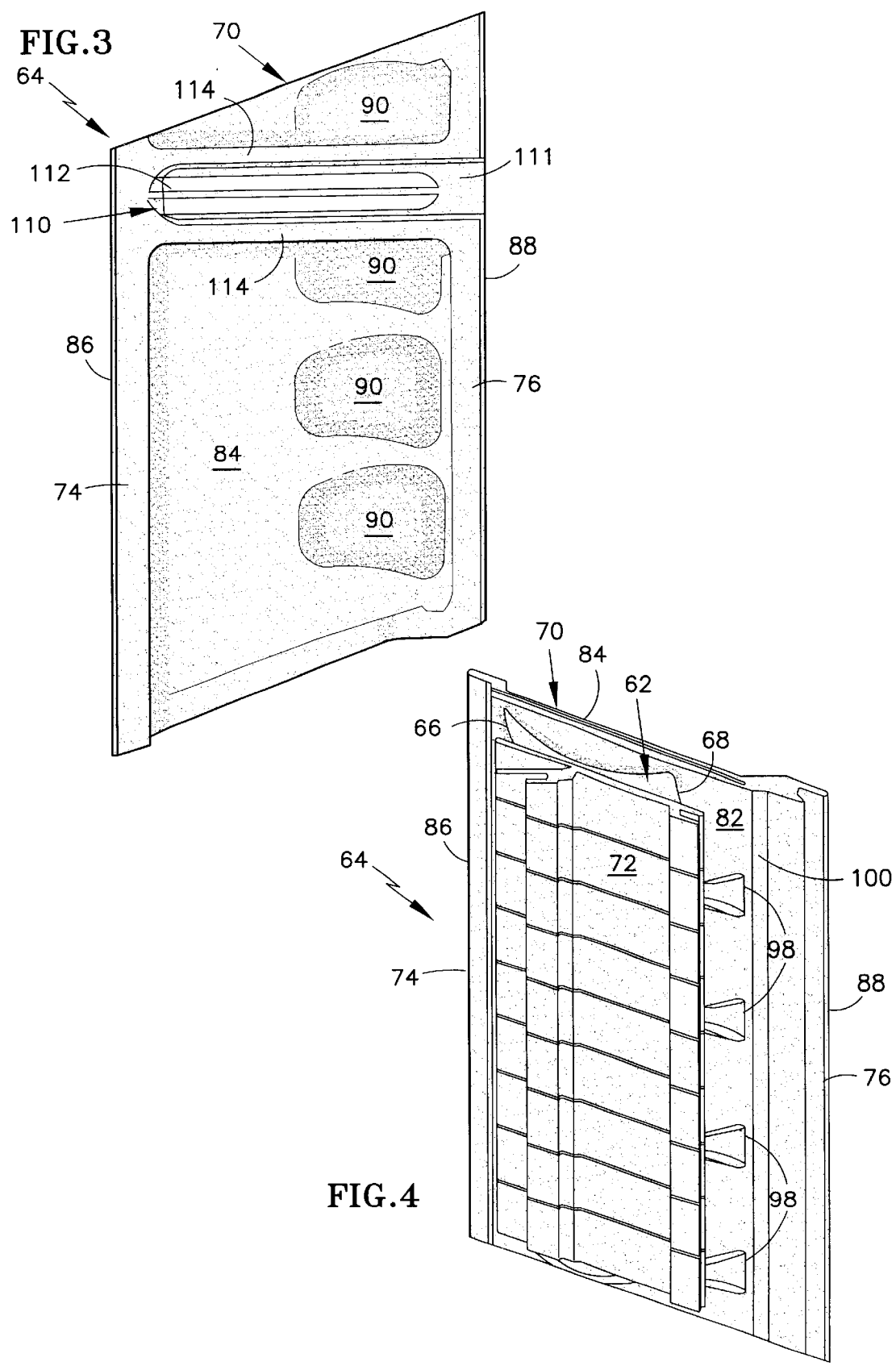

CASING TREATMENT FOR COMPRESSORS

TECHNICAL FIELD

This invention relates to axial flow gas turbine engine compressors, and specifically to a means for enhancing stall margin of the compressor without adversely impacting efficiency by including a treatment to the case of the compressor.

BACKGROUND OF THE INVENTION

In an axial flow gas turbine engine 10, such as the type used on aircraft and shown in FIG. 1, air is compressed in a compressor section 12, mixed with fuel combusted in a combustor section 16, and expanded through a turbine section 14 that, via one or more shafts, drives the compressor section 12. The overall efficiency of such engines is a function of, among other factors, the efficiency with which the compressor section 12 compresses the air. The compressor section 12 typically includes a low pressure compressor 18 driven by a shaft 26 connected to a low pressure turbine 24 in the turbine section 14, and a high pressure compressor 20 driven by a shaft 26 connected to a high pressure turbine 22 in the turbine section 14. The high and low compressors 18, 20 are multi-stage where the air flows in the axial direction through a series of rotating blades and stationary stators or vanes that are concentric with the axis of rotation (longitudinal axis). Each stage includes a row of blades and a row of stators.

The stages are arranged in series, and as air is compressed through each stage, the air experiences an incremental increase in pressure. The total pressure increase through the compressor is the sum of the incremental pressure increases through each stage, adjusted for any flow losses. Thus, in order to maximize the efficiency of the gas turbine engine 10, it would be desirable, at a given fuel flow, to maximize the pressure rise (hereinafter referred to as "pressure ratio") across each stage of the compressor.

One of the design considerations facing designers of axial flow gas turbine engines is a condition known as compressor stall. Compressor stall is a condition in which the flow of air through a portion of a compressor stage ceases, because the energy imparted to the air by the blades of the compressor stage is insufficient to overcome the pressure ratio across the compressor stage. If no corrective action is taken, the compressor stall may propagate through the compressor stage, starving the combustor section of sufficient air to maintain engine speed. Under some circumstances, the flow of air through the compressor may actually reverse direction, in what is known as a compressor surge.

Compressor stalls in the high compressor are of great concern to engine designers, and while compressor stalls can initiate at several locations within a given stage of a compressor, it is common for compressor stalls to propagate from the blade tips where vortices occur. It is believed that the axial momentum of the airflow at the blade tips tends to be lower than at other locations along the airfoil. From the foregoing discussion it should be apparent that such lower momentum could be expected to trigger a compressor stall.

As an aircraft gas turbine engine accumulates operating hours, the blade tips tend to wear away the tip shroud, increasing the clearance between the blade tips and the tip shroud. As those skilled in the art will readily appreciate, as the clearance between the blade tip and the tip shroud increases, the vortices become greater, resulting in a larger percentage of the airflow having the lower axial momentum discussed above. Accordingly, engine designers have sought to remedy the problem of reduced axial momentum at the blade tips of high compressors.

Treatment of the casing to enhance the stall margin and, more specifically, to desensitize the high pressure compressor 20 of an engine 10 to excessive clearances between the blade tips and tip shrouds (tip seal or outer air seal) is shown and described in commonly assigned U.S. Pat. Nos. 5,282,718 to Koff et al., 5,308,225 to Koff et al., 5,474,417 to Privett et al., 5,607,285 to Bryne et al. In practice, the above referenced patents include a plurality of baffles or vanes in the shroud assemblies of the blades. Although effective, these vanes and baffles require an additional machining operation to manufacture. Also, the prior designs require that the passage is formed by mechanically joining the outer diameter and the inner diameter. Thus, manufacturing time and cost is increased to produce the prior art casing treatments. Further, the prior art casing treatments are contained entirely in the blade tip shroud thus requiring yet another machining operation through any abradable material that is used for sealing.

Thus, what is needed is a casing treatment which prevents compressor stall, eases part producibility and reduces manufacturing costs, while increasing the maintainability, assembly and safety as compared to the prior art.

DISCLOSURE OF THE INVENTION

The above discussed and other drawbacks and deficiencies are overcome or alleviated by the present invention.

The assembly of the present invention is formed by a single integral casting that enhance, compressor stall margin, and reduces manufacturing costs while increasing the maintainability, assembly and safety, as compared to the prior art.

In an exemplary embodiment of the present invention, a cast assembly for a gas turbine engine compressor comprises a stator outer platform, a boss, a passage, a blade outer shroud and a circumferential slot. A boss is formed in the platform and includes a passage. The passage includes an inlet and an outlet. The inlet is disposed downstream and proximate to the leading edge of the blades. The outlet being disposed upstream of the leading edge of the blades. The passage circumferentially converges inward from the inlet to the outlet. The outer shroud joins with said outer platform during the assembly of the compressor such that the circumferential slot is formed. The circumferential slot is in flow communication with the inlet.

The foregoing and other features and advantages of the present invention will become more apparent from the following description and accompanying drawings.

BRIEF DESCRIPTION OF THE DRAWINGS

The present invention will now be described, by way of example, with reference to the following Figs., in which:

FIG. 3 is a top view of the outer platform of FIG. 2;

FIG. 4 is a bottom view of inner platform and outer platform of FIG. 2;

BEST MODE FOR CARRYING OUT THE INVENTION

Figure 1:
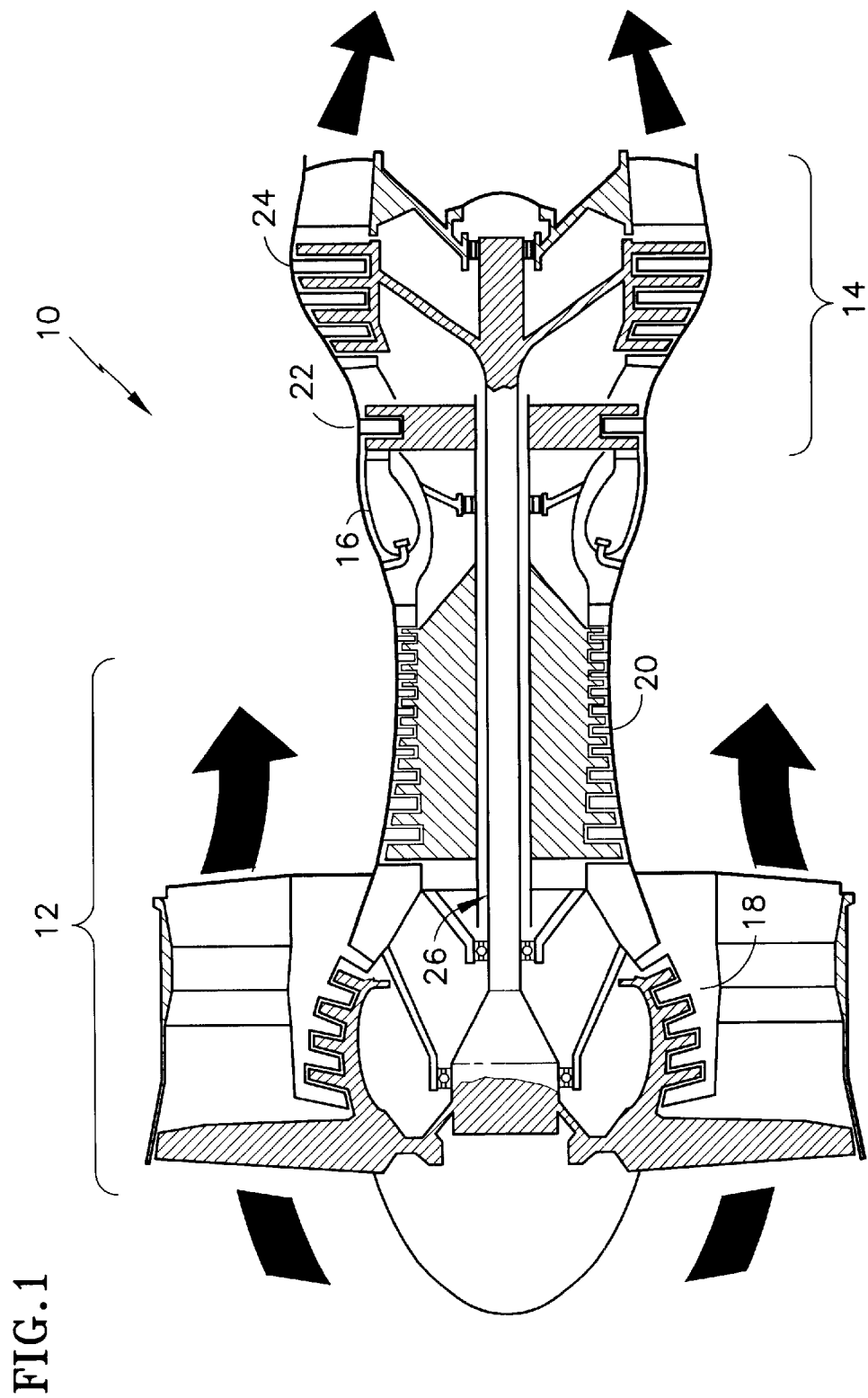
FIG. 1 is a cross section of a gas turbine engine.
Figure 2:
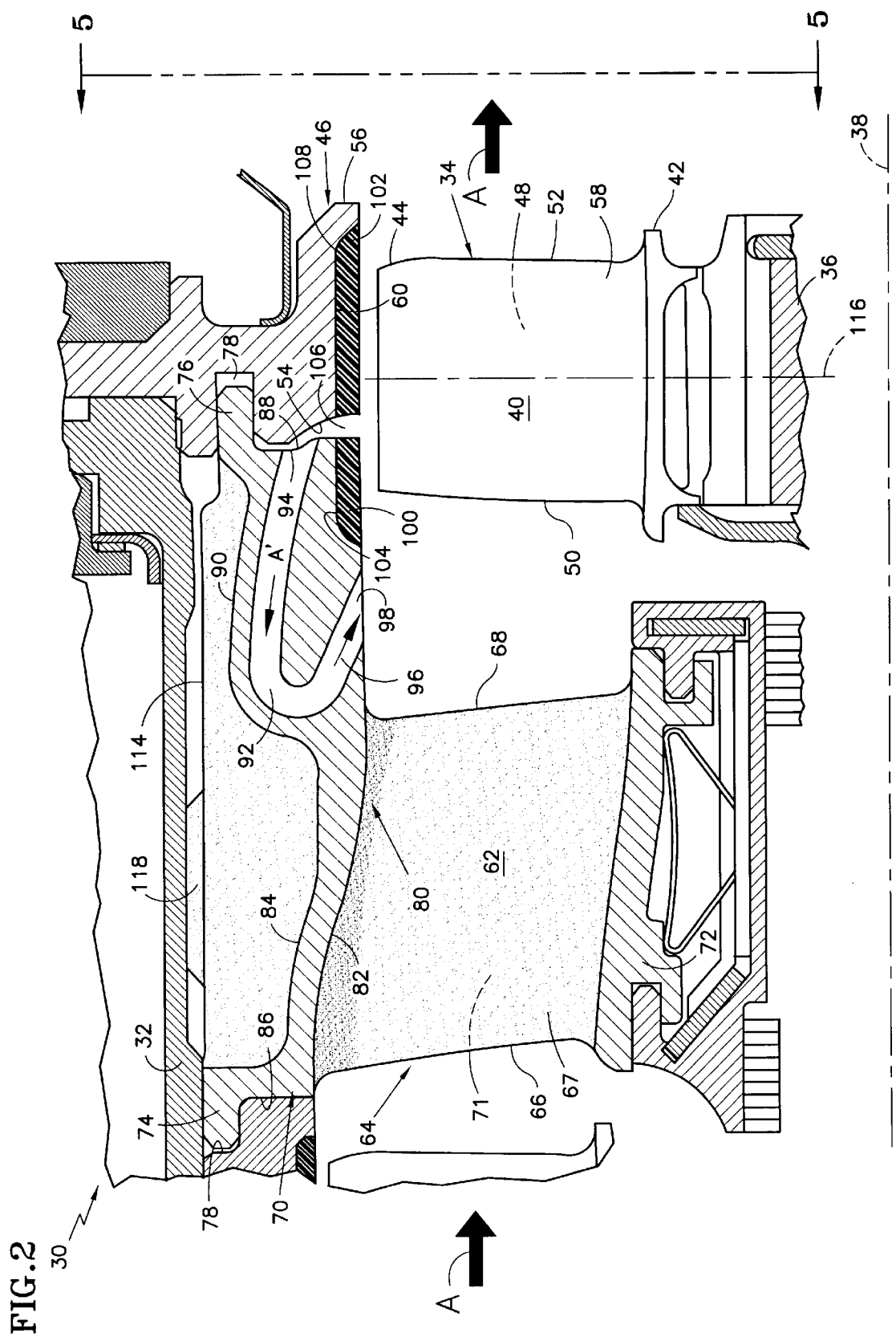
FIG. 2 is a cross sectional partial view of an axial flow compressor including a blade, a vane segment, an outer platform, inner platform and an outer shroud of the present invention.

Referring to FIG. 2, a partial cross-sectional view of an axial flow compressor 30 of a gas turbine engine 10 (FIG. 1) having a case 32 is shown. The main air flow path (main flow path) through the compressor 30 is designated by an arrow, A, and is generally in the axial direction.

An axial flow blade (one of many circumferentially spaced axial flow blades being shown), shown generally at 34, is rotatably supported on a disk 36 of rotor (shaft) 26 (FIG. 1) of the turbine section 14 (FIG. 1) and rotates about a longitudinal axis 38 of the gas turbine engine. The blade 34 includes an airfoil 40 that extends from a blade platform 42 and terminates in a blade tip (tip section) 44. The blade tip 44 rotates in close proximity to an outer shroud (outer air seal) 46. The outer shroud 46 extends circumferentially about the blade tip 44 of a given stage. The blade platforms 42 and the outer shroud 46 define radially inner and outer boundaries, respectively, of the airflow gas path through the compressor 30. The blade 34 includes a leading edge 50 and a trailing edge 52 that bound a suction side 58 and a pressure side 48. The outer shroud 46 of the blade 34 includes a forward wall 54 and an opposing aft wall 56. Bounded by the forward and aft walls 54, 56 of the outer shroud 46 is a radially inner surface 60.

Figure 5:
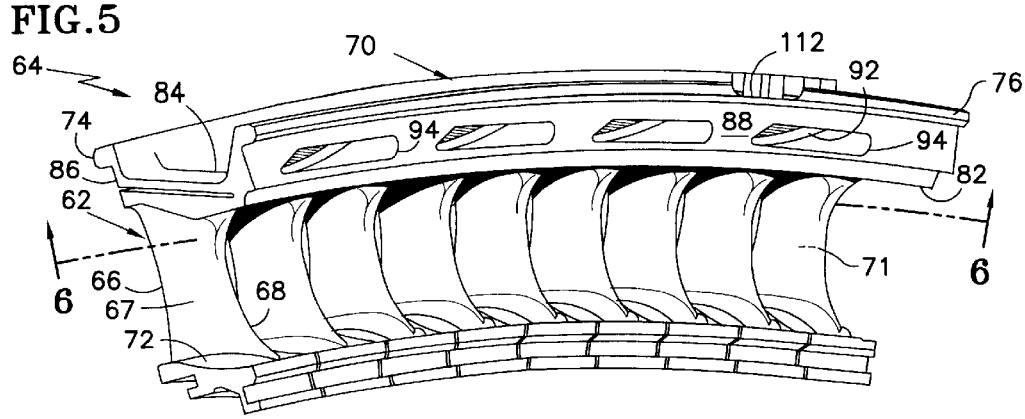
FIG. 5 is an isometric aft view of the vane segment of FIG. 2 taken along 5—5 of FIG. 2.

Stator (vane) is shown generally at 62 and is one of many circumferentially spaced axial flow stators used per stage. A plurality of stators form a stator segment (segment) 64 as shown in FIG. 5. As is readily understood by those skilled in the art, a plurality of stator segments 64 are used for a given stage of the compressor 30. The number of stators 62 on a given segment 64 are a function of engine design and application. The stator 62 includes a leading edge 66 and a trailing edge 68. Bounded by the leading edge 66 and the trailing edge 68 is a suction side 71 and an opposing pressure side 67. The stator segment 64 also includes an outer platform 70 and an inner platform 72 where the outer and inner platforms 70, 72 extend circumferentially to further define the airflow gas path through the compressor 30. The outer platform 70 includes a forward rail 74 and an aft rail 76. The forward and aft rails 74, 76 are circumferential and engage corresponding grooves 78 in the case 32 thereby effecting the attachment of the segment 64 or stator 62 to the case 32 for a given stage, as shown in FIG. 2. To complete the stage, additional and similar segments 64 are assembled into corresponding grooves 78. The case 32 thus supports the stators 62 and outer shroud 46 of the blades 34.

The details of a casing treatment assembly (assembly) 80 that includes the outer platform 70 of the segment 64 and outer shroud 46 of the blade 34 will now be further described.

Referring to FIGS. 2 and 3, the outer platform 70 of the segment 64 includes a radially inner surface 82 and an opposing radially outer surface 84. The inner and outer surfaces 82, 84 are bounded by a forward wall 86 and an aft wall 88 of the outer platform 70. At least one boss 90 extends outward from the outer surface. Preferably, for each segment 64, a plurality of bosses 90 is used as shown in FIG. 3. It is understood by those skilled in the art that the number and spacing of the bosses 90 per segment 64 is determined by engine requirements. Disposed within the boss 90 is a passage 92 having an inlet 94 and an outlet 96. The passage 92 has a cross-sectional area that preferably circumferentially converges inward such that the cross-sectional area of the passage 92 decreases when moving from the inlet 94 to the outlet 96. The inlet 94 is disposed in the aft wall 88 of the outer platform 70 while the outlet 96 is disposed within the inner surface 82 of the outer platform 70. Preferably, the shape of the inlet 94 is an elongated slot. The inner surface 82 of the outer platform 70 includes a depressed region 98 (FIG. 4) that is angled inward towards the outlet 96. Preferably, the outlet 96 has a smaller cross-sectional area than the inlet 94 to maintain the velocity of the air flow and reduce aerodynamic losses.

Figure 6:
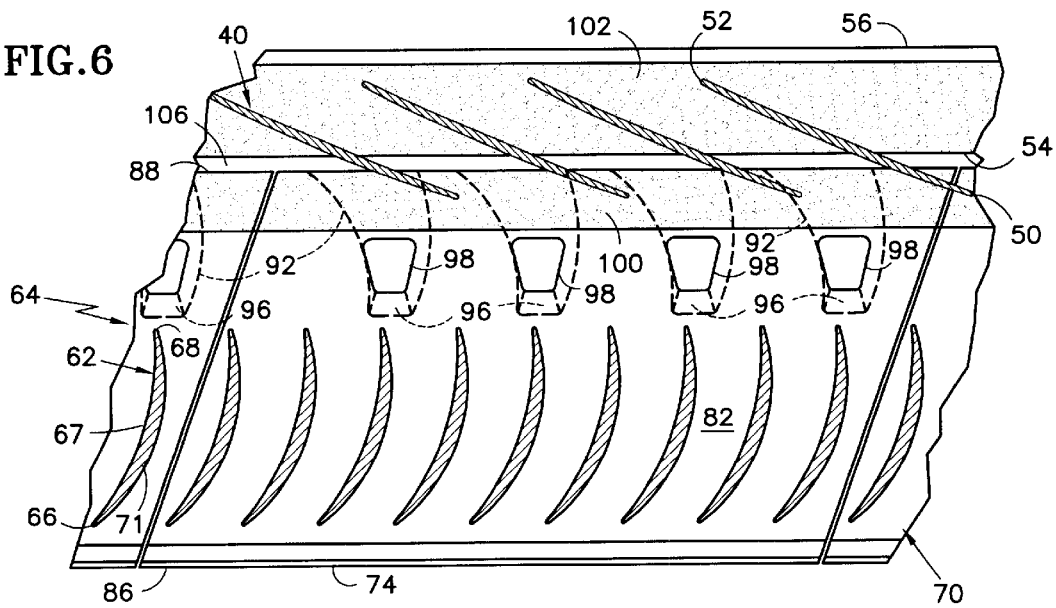
FIG. 6 is an outward view of the vane segment of FIG. 2 taken along 6—6 of FIG. 5.

During assembly, the outer platforms 70 of the segments 64 are joined with the outer shroud 46 of the blades 34 forming a continuous circumferential slot (annulus) 106 therebetween. The circumferential slot 106 is preferably positioned where the pressure gradient across the blade 34 is at a maximum value. The pressure gradient that is to say, the difference in pressure between the suction side 58 and the pressure side 48 across the blade 34, will be at the maximum across the blade tip 44. The advantage of this location will be described hereinafter when the operation of the casing treatment is detailed. The circumferential slot 106 is defined by the aft wall 88 of the outer platform 70 and the forward wall 54 of the outer shroud 46. The circumferential slot 106 is in fluid communication with the inlet 94 of the passage 92 and with the air flow in the region of the blade tip 44. The circumferential slot 106 is preferably orientated such that it is substantially normal to the main air flow A, through the compressor 30, the purpose of which will be discussed in the following paragraphs. The circumferential slot 106 directs the low axial velocity air from the main flow path into the inlet 94 of the passage 92. The cross-sectional area of the circumferential slot 106 converges from the main flow path to the inlet 94 of the passage 92. The convergence of the passage 92 increases velocity of the air within the passage 92 thus keeping the air flowing through the passage 92. Preferably, the velocity of the air in the passage 92 generally approximates the velocity of air in the main flow path thus reducing pressure loss. For further description, a view of the outer platform 70 is shown in FIGS. 5 and 6 viewed from the aft and inner sides, respectively. Inlet 94 is a discrete opening.

A first layer of abradable material 100 attaches to a portion 104 of the inner surface 82 of the outer platform 70 of the segment 64 and extends radially inward therefrom. A second layer of abradable material 102 attaches to a portion 108 of the inner surface 60 of the outer shroud 46 and extends radially inward therefrom. This positioning of the first and second layers of abradable material 100, 102 permits the formation of the inlet 94, outlet 96 and circumferential slot 106 without machining through the abradable material. The abradable material is known in the art and is chosen as required for a particular engine application. It is preferred that the boss 90, inlet 94, outlet 96 and passage 92 are integrally cast with the stator segment 64 forming a single piece cast assembly. It is noted and understood by those skilled in the art that the number of inlets 94 will vary depending on the number of stators 62 cast with the assembly 80.

Referring now to FIGS. 2, 3, and 4, the operation of the casing treatment will be described. The casing treatment assembly is employed to desensitize a given stage from compressor stall. To accomplish this, the casing treatment, or assembly 80, removes vortices formed at the blade tip 44 through the circumferential slot 106 by turning axially upstream a portion of the main flow air, this portion designated by an arrow A'. The circumferential slot 106 is positioned upstream or forward of the longitudinal axis 116 of the blade 34. Preferably, the circumferential slot 106 is located where the pressure gradient on the blade 34 is the maximum. This locates the area where the vortices in the main air flow, A, are the strongest. The vortices are created when the maximum pressure gradient gives rise to adverse pressure gradients in the flow field. By locating the circumferential slot 106 at the point of maximum pressure gradient, the formation of the vortices (swirl) at the blade tip 44 are halted or prevented from developing as that portion of the main air flow, A, having low momentum and low axial velocity, which are conditions conducive to the formation of vortices, is removed from the main flow path by entering the circumferential slot 106. In contrast, air with a strong axial flow tends to remain in the main air flow path and is not recirculated. This is desirable from a component efficiency standpoint to avoid recirculating air more than once. Also, the angle of the circumferential slot 106 relative to the axial direction is preferably normal to the direction of the main air flow, A. This permits the air having low axial velocity to more easily make the turn into the circumferential slot 106. Air having a high axial velocity will not achieve the tight orientation of the circumferential slot 106 as it would be required to do in order to flow into the circumferential slot 106.

Once the selected air is diverted into the circumferential slot 106, the passage 92 reverses the air axially upstream inside the passage 92 and finally reinjects the air into the main flow path through the outlet 96. The air exits the outlet 96 accelerated, as compared to when it entered the circumferential slot 106, due to the converging passage and circumferential slot 106. The outlet 96 is located upstream of the leading edge 50 of the blade 34 and downstream of the trailing edge 68 of the stator 62 to permit the reinjected air to fully mix with the main flow path air.

As the passage 92 is open and converging, the air, upon entering the passage, is converged primarily circumferentially thereby providing for efficient injection of recirculating flow into the main air flow.

Referring to FIGS. 2 and 3, a channel member (member) 110 is shown positioned on the outer surface 84 of the platform 70 between two adjacent bosses 90. The channel member 110 includes a channel 112, preferably recessed, that extends from the forward wall 86 to the aft wall 88 and is open at the aft wall 88. The channel 112 accepts a lug (tack) 118, or similar projection means, at opening 111 proximate to the aft wall 88, that is attached to the case 32 thereby securing the segment 64 into its predetermined circumferential position within the case 32. This provides an anti-rotation feature. The channel 112 is positioned between and adjacent to the bosses 90. The individual passages 92, as shown in FIG. 6, permits the channel member 110 positioning described hereinabove as well as positioning the channel 112 radially inward as opposed to a full circumferential passage. The channel 112 position being radially inward reduces overall engine weight. This reduces overall engine weight. The channel member 110 also includes two opposing rails 114 that extend from the forward wall 86 to the aft wall 88 with the channel 112 formed therebetween.

Figure 7:
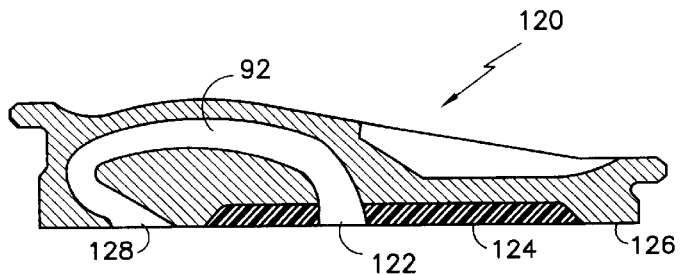
FIG. 7 is a cross sectional view of an alternative embodiment of the outer shroud.

Referring to FIG. 7, an alternative embodiment of the present invention is shown where similar elements are numbered alike. An outer shroud (outer air seal) 120 is shown including the passage 92 having an inlet, preferably a groove 122, and an outlet 128. The passage 92 and groove 122 are contained within the outer shroud 120 of the outer shroud 46. The groove 122 is continuous and circumferential for a given row of assembled outer shrouds 46. The outer shroud 120 as shown in FIG. 7, shares many of the advantages that are described hereinafter. The outer shroud 120 has a radially inner surface 126 and a layer of abradable material 124. The layer of abradable material 124 attaches to a portion of the radially inner surface 126 and extends radially inward therefrom. The groove 122 is disposed in and extends through the layer of abradable material 124. The outlet 128 does not extend through the layer of abradable material 124. It is noted that the positioning of the groove 122 relative to the blade tip 44 is similar to that shown in FIG. 2. Hence, all the advantages associated with this positioning of the groove 122 relative to the blade tip 44 are likewise achieved by the alternative embodiment.

Referring again to FIGS. 1 and 2, the casing treatment assembly 80, as shown and described herein, provides many advantages over the prior art as will now be detailed. The casing treatment includes the passage 92, the boss 90, the inlet 94 and the outlet 96 which are preferably cast integral with the outer platform 70, inner platform 72 and stators 62 to form the segment 64. Thus, the passage 92 is cast within the boss 90 and there is no mechanical joining required to form the passage 92. Also, the circumferential slot 106 is formed by the joining of the outer platform 70 with the outer shroud 46 which is advantageous. Since this is the area where the abradable material is used, the circumferential slot 106 does not require any masking and/or machining operations in the abradable material to be formed. Thus, this feature significantly increases castability of the segment 64. This enhanced castability is preferable when the segment 64 is in the high pressure compressor 20 and most preferable in the higher stages of the high pressure compressor 20, that is to say, the stages proximate to the combustor section 16. Also, no additional machining is required to form the circumferential slot 106 since it is formed during assembly of the outer platform 70 and outer shroud 46 within the case 32. Yet another feature of the casing treatment is that the reinjection point or outlet 96 is not located within the abradable material. This permits the outlet 96 to be cast to size with the segment 64 instead of machined, for example, by milling, through the abradable material. Finally, the location of the outlet 96 permits the recirculated air in the passage 92 to mix with the main air flow ahead of the leading edge 50 of the blade 34, and more specifically, the blade tip 44.

Yet another feature of the casing treatment is that the passage 92 does not include any vanes, baffles or similar flow guides. This permits the segment 64 and casing treatment contained therein to be a single cast construction providing the benefits listed above, as well as reducing manufacturing time and cost associated with producing the flow guides. Also, the lack of flow guides within the passage 92 desensitizes the area convergence within the passage to manufacturing tolerances as well as increases the durability in the event of a blade rub on the abradable material. It is also noted that the metal located in the boss 90 between the passage 92 and the flow path is thick enough to withstand rubbing by the blade tip 44 on the shroud 46.

Another advantage of the casing treatment, as described herein is that it utilizes discreet passages 92 that permit the maintenance of the predetermined converging cross-sectional area. This area of the passage 92 is larger than the tolerances that control it. Further, the use of bosses 90 reduces overall weight of the segment 64 and provides a means to move the anti-rotation feature, channel 112, inward avoiding additional engine weight. It is noted that it is desirable to reduce the weight of the segment 64 to reduce rigidity and permit stator deflection during engine operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An assembly for a gas turbine engine compressor, the compressor includes a case and a rotor having a plurality of axial flow blades within the case, each of the blades having a tip section and a leading edge, said assembly comprising:
   a vane having an outer platform, said platform defining an outer boundary for a main flow path:
   a passage formed in said platform, said passage having an inlet and an outlet, said inlet being disposed downstream and proximate to said leading edge of the blades, said outlet being disposed upstream of the leading edge of the blades, said passage circumferentially converges inward from said inlet to said outlet;
   an outer shroud surrounding the blades, said outer shroud and said platform collectively defining the outer boundary for the main flow path; and
   a circumferential slot, said circumferential slot in flow communication with said inlet, said circumferential slot formed between said outer shroud and said outer platform.

2. The assembly of claim 1 further including a boss formed in said platform and wherein said passage is formed within said boss.

3. The assembly of claim 2 wherein said boss and said passage are integrally cast with said outer platform such that said assembly is a single piece integrally cast assembly.

4. The assembly of claim 1 wherein said outer shroud having a radially inner surface, said platform having a radially inner surface, and an opposing outer surface, and further comprising a first layer of abradable material, said first layer of abradable material attaches to a portion of said radially inner surface of said outer platform and extends radially inward therefrom and a second layer of abradable material, said second layer of abradable material attaches to a portion of said radially inner surface of said outer shroud and extends radially inward therefrom,
   wherein said circumferential slot is positioned between said first and second layers of said abradable material.

5. The assembly of claim 4 wherein said outlet is disposed upstream to said first layer of said abradable material.

6. The assembly of claim 4 wherein said outer platform includes:
   a forward rail and an opposing aft rail, said forward rail and said aft rail bounded by said inner and outer surfaces of said platform, and
   a channel member, said channel member extends between said forward wall and said aft wall and includes a channel and a tack, said tack engages said channel,
   wherein said forward and aft rails slidingly engages within corresponding grooves in the case and said tack engages the case at a predetermined location to securely position said outer platform within the case.

7. The assembly of claim 6 further including:
   a first boss, formed in said platform, and a second boss formed in said platform adjacent to said first boss, wherein said channel member extends between and adjacent to said first boss and said second boss.

8. The assembly of claim 1 wherein said circumferential slot is disposed in a normal direction with respect to the main flow path and said circumferential slot selectively removes from the main flow path solely the low momentum, low axial velocity flow and prevents removal of high axial velocity flow.

9. The assembly of claim 1 wherein said circumferential slot is disposed between said outer shroud and said outer platform and overlaps at a location on the tip section of the blade at which substantially maximum pressure gradients occur.

10. The assembly of claim 1 wherein said platform and said passage are integrally cast such that said assembly is a single piece integrally cast assembly.

11. The assembly of claim 1 wherein said platform having a radially inner surface and further comprising a layer of abradable material, said layer of abradable material attaches to a portion of said radially inner surface and extends radially inward therefrom, said inlet is disposed radially outward of said abradable material.

12. An assembly for a gas turbine engine compressor, the compressor includes a case and a rotor having a plurality of axial flow blades within the case, each of the blades having a tip section, a leading edge and a longitudinal axis, said assembly comprising:
   a vane having an outer platform, said platform defining an outer boundary for a main flow path;
   a passage formed in said platform, said passage having an inlet and an outlet, said inlet being disposed downstream and proximate to said leading edge of the blades, said outlet being disposed upstream of the leading edge of the blades, said passage circumferentially converges inward from said inlet to said outlet; and
   a circumferential groove in flow communication with said inlet, said circumferential groove disposed in a normal direction with respect to the main flow path and said circumferential groove selectively removes from the main flow path solely the low momentum, low axial velocity flow and prevents removal of high axial velocity flow;
   wherein said groove overlaps at a location on the tip section of the blade upstream of the longitudinal axis of the blade.

* * * * *

UNITED STATES PATENT AND TRADEMARK OFFICE
CERTIFICATE OF CORRECTION

PATENT NO.    : 6,585,479 B2
DATED         : July 1, 2003
INVENTOR(S)   : Mark Torrance It is certified that error appears in the above-identified patent and that said Letters Patent is hereby corrected as shown below:

<u>Title page,</u>
Item [74], the last name of the attorney should be -- Cunha -- and not "Gunha"

Signed and Sealed this

Seventh Day of October, 2003

JAMES E. ROGAN
*Director of the United States Patent and Trademark Office*